Sept. 14, 1965  J. SVINGOR ETAL  3,206,666
POSITIONING APPARATUS
Filed April 30, 1963  4 Sheets-Sheet 1

United States Patent Office 3,206,666
Patented Sept. 14, 1965

3,206,666
POSITIONING APPARATUS
Jenö Svingor, Jenö Barátossy, Zoltán Hadik, Dezsö Schlosser, János Varga, and Ferenc Zátonyi, Budapest, Hungary, assignors to Szerszámgepfejlesztö Intézet, Halasztelek, Hungary, a firm
Filed Apr. 30, 1963, Ser. No. 276,902
Claims priority, application Hungary, May 15, 1962, SE–1,134
6 Claims. (Cl. 318—467)

It has been proposed heretofore to build control equipment for servo-motors, consisting essentially of a roller, rolling on a uniformly revolving spindle and due to the incline of its rotating plane, moving at a determined speed in the direction of the spindle axis; if the incline changes the spindle is displaced, this being turned to account for purposes of control. A subsequent proposal provides storage of data determining the cycle of movements by means of elements (plates, riders, set-screws etc.) adjustable on a suitable limit stop system in such a manner that a feeler of the roller of the hydro-mechanical servo-motor which is provided with a rolling spindle, engages with the ends of riders attached to a drum stop, at the section limits of the cycle of movement. The co-ordinates of the end positions of the sections are determined by the setting of the riders along the generatrix of the drum or drums, in the event of cycles of movement consisting of several components. As the drum rotates one division further, the slide of the servo-motor controlled machine-tool moves off toward the end point of the following rider, and continues moving until the feeler contacts this rider, and engaging against it, stops movement of the slide by bringing the lever of the roller to the central postion.

The present invention may be considered a development of the designs described in the foregoing and relates primarily to the substitution of the stops (riders) by signal combinations corresponding to any numerical system. In the materialization of this principle an assembled series of step-formed measuring bodies is used, thus in effect the mass of elements of a measuring prism series (Rapporter) is assembled in a column, and one end of this column rests against a base surface, while the other end of the column determines the point at which the feeler of the roller must register. In carrying out the principle, the problem of automatization, which forms the main object of the invention, is restricted to determining the manner in which assembly of the measuring bodies can be rendered automatic. In order to facilitate this step, formed measuring bodies are used in place of the customary measuring prisms, and in this manner the number of measuring elements is considerably reduced.

An advantageous embodiment of the invention uses 10 steps, corresponding to the decimal numerical system in each measuring body. Each position value, of the digits of the measure figure, to be set by means of the measuring bodies, corresponds to one measuring body, thus for example one measuring body can be used for setting millimetres, one for centimetres and a third for setting decimetres. The value of the digits of the measure figure are set by using the appropriate step of the measuring body. Thus for instance if the feeler rests against step 3 of the decimetre measuring body, the end surface of this engages with step 5 of the centimetre measuring body and the end surface of the latter engages with step 8 of the millimetre measuring body, then the figure set is 358. If the millimetre measuring body does not move on a fixed base surface but can for example be moved tenths of millimetres by means of a sliding key, then this sliding key can be used for setting fractions of millimetres.

Naturally, instead of the end surface, a selected step of the measuring body can engage against a determined step of the other measuring body.

In principle the numerical values can be contained in any type of information storage unit; in the example given in this specification, the drum control is used, as the simplest practicable method. The numerical value can easiest be fixed on this drum by means of a mechanical element (e.g. a plug). Theoretically the simplest method would be to provide ten plugging sockets on each measuring body of the drum to facilitate setting of one of the ten steps, in practice however it proves less costly to provide only five plugging points for each measuring body, each point having two plugs which can be combined to give ten variations. In this manner the value of a digit is expressed by placing the two plugs in any two of the five plugging points. As this provides exactly ten possibilities, this principle is suitable for expressing numeral values of the decimal numerical system, with two plugs.

The following advantages are obtained by determining the cycle data by means of numerals instead of by setting riders etc.

(1) Readjustment of the machine from one workpiece to another is accelerated, as introduction of numerals is quicker than determining positions for stops and then setting the stops.

(2) Accuracy of the data transmitted is not dependant upon the quality of the work performed by the person setting the machine, and this on the one hand ensures accurate work and on the other hand relieves the operator of accurate work required for the setting of stops. Setting by means of the invention is surely accurate, and even if an error occurs, it is readily detected and corrected.

(3) If the machine has several slides, setting does not take place at the individual slides but at a single central point, and it is even possible to control several machines from one single point. In this manner it is possible to incorporate machine setting in the administrative work which in any case precedes machining work. This is advantageous from the aspect of proper sequence of the individual working phases, accurately dovetailing working times and lastly, perfecting organization of the work.

The drawings illustrate an embodiment of the invention.

FIG. 2 shows in side elevation the components not illustrated in FIG. 1, viewed from the direction of the arrow seen on the left hand side of FIG. 1, while

Figure 4:
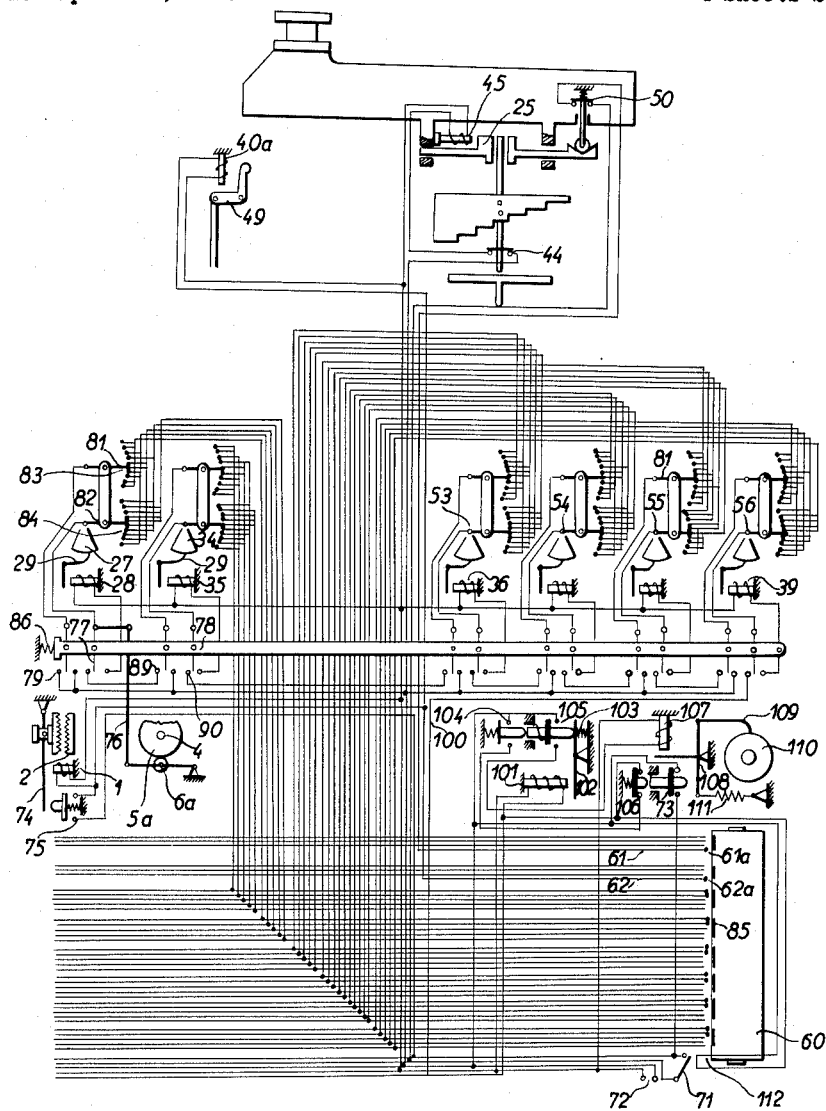

FIG. 4 shows the electrical equipment and those parts only of the mechanical components, which are directly connected with the electrical equipment. The figure presents the electrical components of the control equipment of the central point and one unit (the control of one slide). It is however obvious from the figure, that several similar units can be connected in the same manner to the central point. In order to demonstrate this, the leads shown at the bottom of the figure are extended to the left, and from these extensions branch wires can be lead off to the other units (not shown), similarly to the vertical leads shown in the figure.

Figure 5:
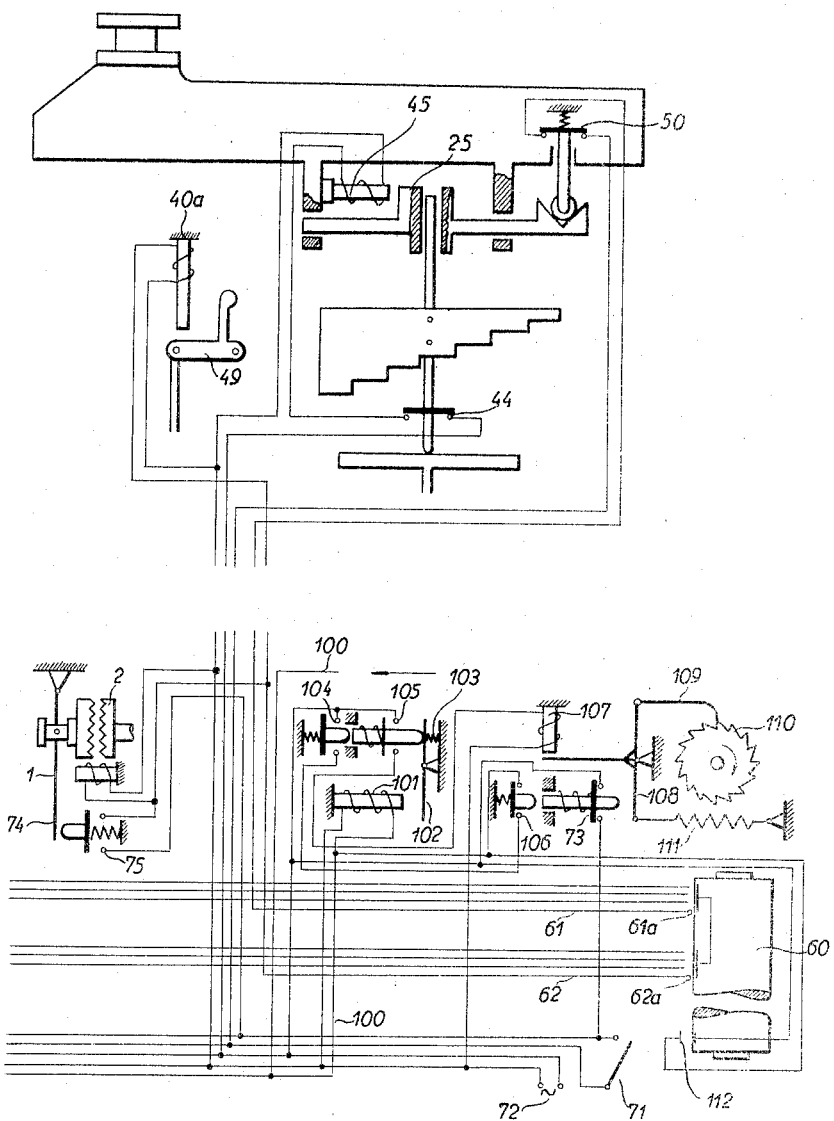
Figure 6:
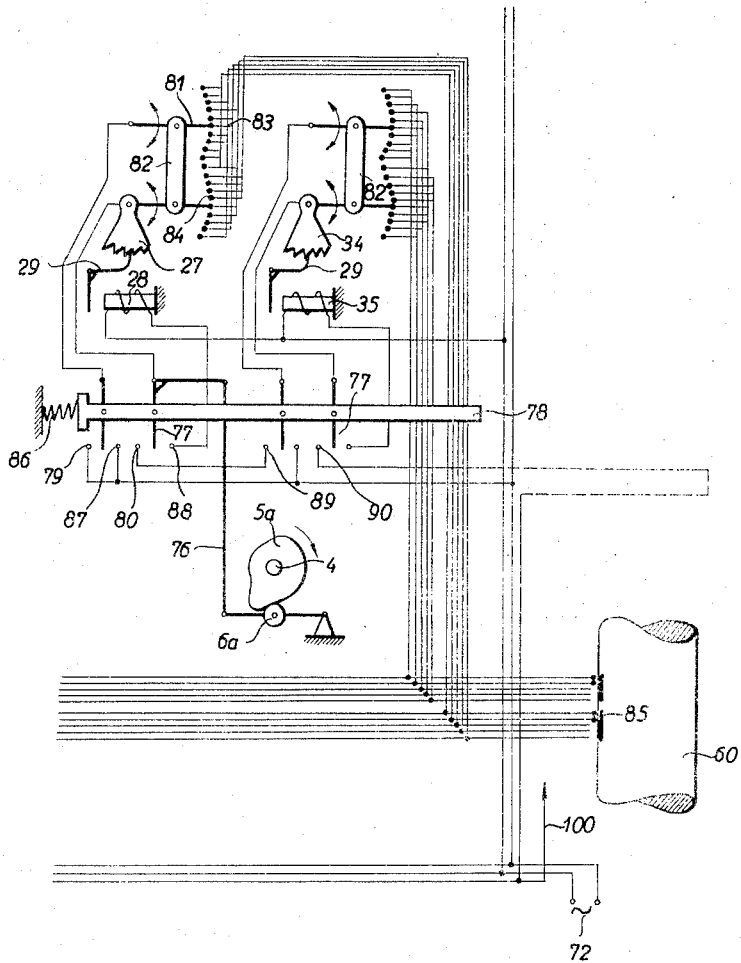

FIGS. 5 and 6 show larger scale details of the equipment presented with FIG. 4.

Figure 1:
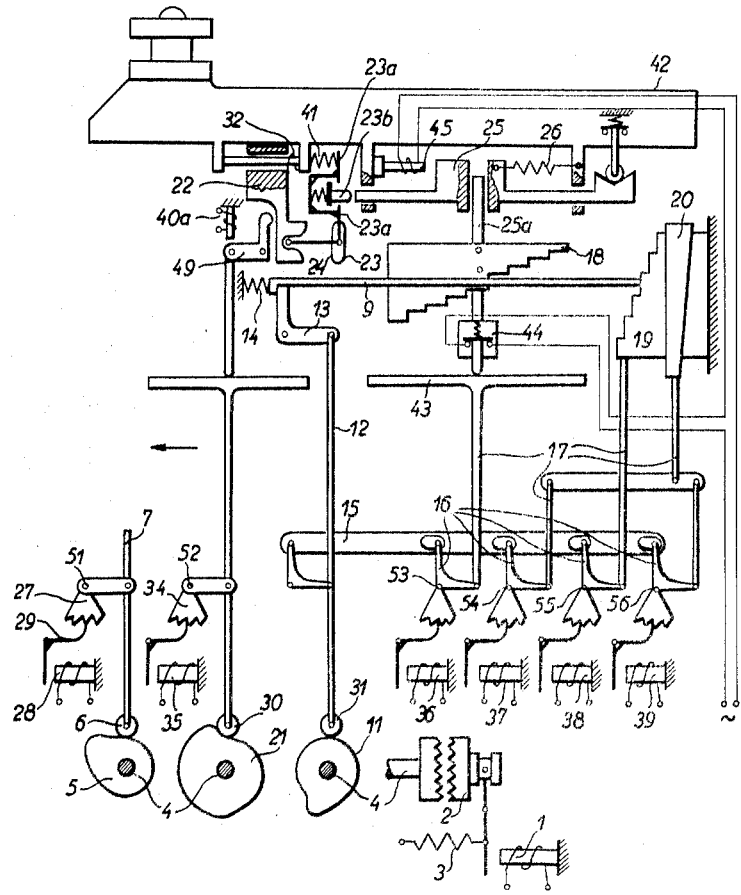
FIG. 1 is a diagrammatic representation of the control equipment of one slide of a machine-tool, e.g. a turret lathe, which equipment may be termed "a unit"; in order better to facilitate understanding, all components are shown in one plane. The figure shows principally the mechanical components.

Referring to FIG. 1, roller 23 rolling on the revolving spindle not shown, in the position shown in the figure when its plane of rotation is rectangular to the axis of the spindle, is not displaced axially. If however it is turned from this plane, it will be shifted in the direction of the rolling spindle axis. The speed of this movement increases proportionately to the angle of the plane of rotation in a manner already known.

By means of the equipment according to the invention, control is effected in such a manner that roller 23 is, by means of lever 23a, turned in the appropriate direction and to the required degree at the desired moment. For this purpose, the lever operates in concert with feeler 25 through the agency of a spring tensioned push button 23b, and the feeler takes up the required position according to the invention in the manner already described in the introduction and to be detailed in the following.

As already mentioned, setting of feeler 25 is determined by the measuring bodies (measuring laths) and as shown in FIG. 1, the position of the feeler is secured by rod 25a fixed to measuring body 18, and which moves longitudinally together with the feeler but is laterally displaceable thereon. This measuring body 18, by means of the set centimetre step, engages against a decimetre step of measuring body 9, and this latter is pressed against a certain step of a further measuring body 19. Fractions of millimetres can be set by means of a key 20. In accordance with the invention, upon completion by the machine of each of the individual working processes, these measuring bodies are automatically brought to the desired position by previous setting of the plugs already mentioned. This function is described in the following, linked with an exemplification:

With switch 71 (FIG. 5) turned on, current source 72 energizes electro-magnet 1, and electro-magnet 40a in parallel circuit therewith, via closed contacts 73, 50, 61a and 62a. Electro-magnet 1 draws lever 74, closing contact 75, thereby bridging contacts 50, 61a, 62a and 71 and maintaining the circuit even in the event of these latter contacts opening. Dog clutch 2 is engaged by lever 74 operating against spring 3 (FIG. 1) and camshaft 4 commences rotation. There is only one shaft 4 and FIG. 1 shows only for the sake of a clear illustration more such shafts.

Figure 2:
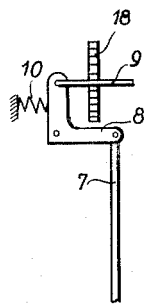
Figure 3:
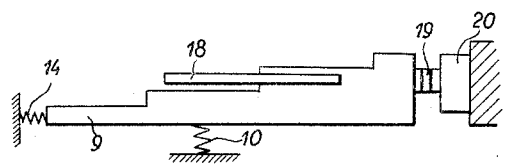
FIG. 3 is a plane view pertaining thereto.

Roller 30 is raised by means of cam 21 and locking lever 22 is moved to the right by angle level 49, thereby securing lever 24 of roller 23 of the roller spindle. Cam 5 raises roller 6 and draws decimetre lath 9 to the left through components 7, 8 (FIG. 2) against the force of compression spring 10. The lath moves downwards according to FIG. 3 and as shown in FIG. 1 it moves upwards at a right angle to the plane of the drawing.

Following the above movement of the lath (measuring body) 9, cam 11 and the transmission elements 12, 13 enable lath 9 to move to the left against the action of spring 14 as shown also in FIG. 1. Simultaneously with left hand movement of lath 9, carrier lath 15 is also shifted to the left, transmitting positive lift to measuring bodies 18, 19, and to taper key 20 via angle levers 16 and rods 17. Due to the distance between decimetre lath 9 and centimetre lath 18, feeler 25 is moved to the right by tension spring 26, but roller 23 remains in the position where it is secured by the arm 24.

Following this cam 5 during its continued rotation permits lowering of roller 6 (FIG. 1) and thereby decimetre lath 9 moves to the right due to the action of spring 10, and ratchet device 27, which turned anti-clockwise as roller 6 rose, now turns to the right. At an intermediate point during this movement, an impulse is imparted to electro-magnet 28. This impulse is brought about as follows, as roller 6 commences its descent, the recess in cam 5a frees roller 6a to rise (FIG. 6), whereupon levers 77 with rods 78 are swung to the right through spring 86 due to the action of rod 76, and in this manner they come into contact with contacts 87, 88; they remain in contact during the return movement of ratchet device 27. Meanwhile, contact levers 81, 82 which move together with ratchet 27, slide along contacts 83, 84, of which two are coupled by the plug pair 85, located on programming drum 60.

For the sake of simplicity FIG. 4 shows cam 5a as circular.

When levers 81, 82 reach the said contacts coupled to each other, electro-magnet 28 is energized from current source 72 and the magnet lifts pawl 29 into the corresponding tooth gap of ratchet 27. As a result, the ratchet remains stationary in this position. Now also rollers 30, 31 descend, whereby lock lever 22 would move to the left under the influence of spring 32, but is prevented in this by magnet 40a, as this magnet is in parallel circuit with magnet 1. Thus the magnet remains drawn and holds the left lever arm of angle lever 49 in positive lift position. Roller 30 however descends, ratchet 34 commences turning to the right until it is stopped by electro-magnet 35.

Together with roller 31 which likewise descends to the right, the parts 17–20 also move downwards, during which, due to the action of electro-magnets 36–39, they remain in their various positions together with the ratchets, which, along with their respective angle levers 16, turn about pivots 53–56 (see also FIG. 4). Meanwhile roller 31 continues its descent, causing decimetre lath 9 actuated by spring 14, to engage the corresponding step of millimetre lath 19. Following descent of rollers 6, 30 and 31, cam-disc 5a pushes roller 6a so far downwards (FIG. 6) that rod 78 acting against spring 86 is moved leftwards to its limit position, whereby contacts 79, 80, 89, 90 etc. come into contact with the respective contact levers 77, i.e. all the selectors are in series circuit. In this manner the current of current source 72 passes to conductor 100 (FIG. 6) via the selectors in series and from there to an electro-magnet of control relay 101 (FIG. 5); this relay swivels rocker arm 102 against spring 103, whereupon contacts 104, 105 are closed. The dash lines on the right hand side of FIG. 6 illustrate that the selectors controlled by magnets 36–39, which are located between contact 90 and conductor 100, are similarly in series circuit when rod 78 moves to the left.

The end of conductor 100 marked with an arrow on FIG. 6 connects to the similarly marked conductor 100 shown on FIG. 5.

Contact 104 ensures self-holding of the relay through the shorted contact 106, while electro-magnet 107 is energized through contact 105 and lifts the horizontal arm of a three-arm lever 108 thus turning the upper arm to the right, whereupon pawl 109 turns ratchet wheel 110; programming drum 60 which is coupled to the latter also rotates together with the wheel. Meanwhile the lower arm of the lever system opens first contact 73 and then contact 106. Electro-magnets 1 and 40a release when contact 73 is open, whereupon on the one hand, shaft clutch 2 disengages (FIG. 1) and rotation of control shaft together with all cam discs thereon ceases (in the meantime these have made one complete revolution and have returned to their starting position), and on the other hand lever lock 22 is moved to the left by spring 32, releasing lever 24. Now two cases can be differentiated:

(1) Centimetre lath 18 is held by magnet 36 at an elevation at which it does not touch decimetre lath 9. In this case, roller 23 swings to the right under the influence of spring 41 when lever 24 is released, slide 42 commences movement to the right and continues this movement until a tooth of centimetre lath 18 engages in a tooth of decimetre lath 9, whereupon it is brought to a standstill by the impact.

(2) The centimetre lath descends so far that in its passage it engages decimetre lath 9. As the T-formed lath 43 under the latter has descended further down and contact 44 closes, electro-magnet 45 becomes energized, feeler 25 moves to the left against the action of tension spring 26, whereupon roller 23 swings out to the left, and slide 42 moves leftwards until contact 44 moving together with the continually descending centimetre lath 18, again reaches lath 43; hereupon contact 44 disconnects and electro-magnet 45 releases. In this manner one step of centimetre lath 18 remains engaged with decimetre lath 9, and slide 42 is brought to a standstill by the mediation of the roller 23.

It has already been mentioned that when switching on magnet 107, first contact 73 and then also contact 106 is opened. Opening of contact 106 occurs when ratchet wheel 110 has rotated one division further. When contacts 106 open, self-holding of relay 101 ceases, the relay and magnet 107 release, whereby components 108, 109 return to their normal positions under the effect of spring 111, but contacts 73, 106 are closed again. Since, however, programming drum 60 has in the meantime proceeded one step, a fresh row is selected by contacts 61a, 62a, also 85 etc. (FIG. 6). Meanwhile magnets 1 and 40a cannot be switched on again and this condition remains as long as contact 50 stays open. This contact opens when feeler 25 swings to the right or left during the control period (FIG. 1). Contact 50 closes again when the slide reaches the end of the stroke in process and feeler 25 reaches thus its central position. Upon closing the circuit, an electrical signal is transmitted to magnet 1 and 40a of the slide unit following in sequence in the new program corresponding to contacts 61a or 62a. Accordingly, either the same or another slide will commence movement.

If it is sufficient to operate only one of the individual slide units (of which only one is presented in the drawing) at a time, then only contacts 62a are required. This means that it would be sufficient only to program the slide which is to be started by the signal resulting from the closing of contact 50. In order, however, to provide simultaneous movement of several slides it becomes necessary to be able to select among the start signals which are generated through contact 50 by all the units. This purpose is served by leads 61 and the plugs are inserted in the desired position, so that the signal is given by that one of the four lines 61, which is selected by the machine operator. The number of these lines may be, of course, more or less than four. By means of this signal, the slide of the unit, among the four units, for which plug 62a has been inserted, will be started up through lead 62.

Since all contacts 50 of a slide are closed when the slide is stationary, facilities exist for transmitting signals from stationary slides also and it is therefore possible, while one slide is in motion, to start up a further slide from a stationary side by rotating drum 60 in the manner described in the foregoing, and by further rotation, to start up still further slides. Namely, drum 60 rotates further after each start is made.

Control relay 101 fails to function if due to any cause whatsoever, information stored in the programming drum is erroneously relayed to the individual units, and therefor consequences of such errors do not follow, i.e. the slide will not start and clutch 2 will not disengage. The control shaft continues rotation (FIG. 1) and the entire control cycle continues repeating until the program is received faultlessly by the unit (active control).

If the program consists of fewer cycles or periods than the number of program drum divisions, the superfluous positions are skipped over by the drum (spinning). This is attained by placing a plug at contacts 112 only for these positions, and when these are shorted relay 101 is energized, and the drum then proceeds without transmitting a program.

We claim:

1. In a control equipment actuated by numerals for servo-motors for speed determination of the motor according to a predetermined program and for stopping the motor at the positions determined by the program, automatically assembled measuring bodies having a stepped formation corresponding to the magnitudes of the measuring system, said stepped measuring bodies contacting each other at the steps thereof and intersecting at right angles, an electro-mechanical selector allotted to each measuring body, such selector consisting of contacts, electro-magnets and a ratchet device wherewith the selector is able to move the measuring body and bring it to a standstill in the desired position, an electric switch between one of the measuring bodies and the selector which is adapted to commute in the event of another measuring body standing in the path of the said measuring body and this switch is connected to an electro-magnet through which control lever of the servo-motor can be influenced in one direction, and this lever is joined to a spring which tends to turn the lever in the other direction and is weaker than the electro-magnet.

2. In a position-controlling apparatus, an element whose position is to be controlled, said element being movable along a path which is parallel to and spaced from a given plane, a first measuring body having a stepped formation situated in a second plane which is normal to said given plane, said first measuring body being movable in said second plane in directions parallel to said given plane and perpendicular to said given plane and said first measuring body being operatively connected to said element for moving the latter along said path during movement of said first body in said direction parallel to said given plane, and said first body being operatively connected to said element for movement with respect thereto during movement of said first body in said direction perpendicular to said given plane, and a second measuring body having a stepped formation situated in said given plane and located in the path of movement of said stepped formation of said first body, said second body being movable in said given plane in the direction perpendicular to said second plane for situating a selected step of said stepped formation of said second body in the path of movement of said stepped formation of said first body while said first body during movement perpendicular to said given plane will situate a selected step of said step of said stepped formation of said first body in said given plane to engage with a selected step of said second body while movement of said selected step of said first body into engagement with said selected step of said second body will determine the position of said element.

3. In an apparatus as recited in claim 2, one of said stepped formations having steps whose size is a predetermined fraction of the size of the steps of the other of said stepped formations.

4. In an apparatus as recited in claim 2, a third stepped measuring body having a stepped formation situated in a third plane parallel to said second plane, said third body being movable in said third plane in a direction perpendicular to said given plane and said stepped formation of said third body engaging said second body so that during movement of said third body in said third plane a selected step of said third body will engage said second body to determine the position of the latter in said given plane, said second body being movable in said given plane in a direction parallel to said path for engaging a selected step of said stepped formation of said third body to determine the position of said stepped formation of said second body in said given plane.

5. In an apparatus as recited in claim 4, the steps of one of said stepped formations having a magnitude equal to a given unit, the steps of a second one of said stepped formations having a magnitude equal to a tenth of said unit, and the steps of the third stepped formation having a magnitude equal to a hundredth of said unit, so that said stepped measuring bodies are capable of positioning said element according to a decimal measuring system.

6. In an apparatus as recited in claim 4, elongated wedge means engaging said third body and movable with respect thereto for determining the position of said third body in said third plane, said wedge means displacing said third body in a direction parallel to said path.

References Cited by the Examiner

UNITED STATES PATENTS

| | | | |
|---|---|---|---|
| 2,140,667 | 12/38 | Corsepius et al. | 318—467 X |
| 2,669,615 | 2/54 | Cox | 318—467 X |
| 2,686,894 | 8/54 | Mathieu | 318—467 X |
| 2,889,508 | 6/59 | McCoy et al. | 318—467 X |
| 2,899,621 | 8/59 | Bauer | 318—467 |

ORIS L. RADER, *Primary Examiner.*